(12) United States Patent
Morita et al.

(10) Patent No.: US 7,452,595 B2
(45) Date of Patent: Nov. 18, 2008

(54) HEAT-SENSITIVE ADHESIVE MATERIAL, ADHERED ARTICLE, PROCESS AND APPARATUS FOR THERMALLY ACTIVATING THE HEAT-SENSITIVE ADHESIVE MATERIAL

(76) Inventors: Mitsunobu Morita, 114-8, Nishimakado, Numazu-shi, Shizuoka (JP); Tomoyuki Kugo, Urban City Ebaracho 402, 4-22, Ebara-cho, Numazu-shi, Shizuoka (JP); Hiroshi Goto, 44-22, Funatsu, Fuji-shi, Shizuoka (JP); Norihiko Inaba, 12-24, Minamihongo-cho, Numazu-shi, Shizuoka (JP)

( * ) Notice: Subject to any disclaimer, the term of this patent is extended or adjusted under 35 U.S.C. 154(b) by 518 days.

(21) Appl. No.: 10/850,875

(22) Filed: May 21, 2004

(65) Prior Publication Data

US 2004/0265573 A1    Dec. 30, 2004

(30) Foreign Application Priority Data

May 23, 2003   (JP)   ............................. 2003-146117
May 6, 2004    (JP)   ............................. 2004-137348

(51) Int. Cl.
*B32B 15/04*   (2006.01)
*B32B 7/12*    (2006.01)

(52) U.S. Cl. ............ 428/347; 428/355 R; 428/355 AC; 428/355 N; 428/339; 428/65.2; 428/913; 156/309.9; 156/320; 156/322; 156/325

(58) Field of Classification Search ................ 428/34.6, 428/355 R, 355 AC, 355 N, 65.2, 339, 913, 428/36.91, 347; 156/309.9, 320, 322, 325
See application file for complete search history.

(56) References Cited

U.S. PATENT DOCUMENTS

| 5,827,590 | A  | 10/1998 | Morita et al. |
| 6,500,536 | B1 | 12/2002 | Yamada et al. |
| 6,501,495 | B1 | 12/2002 | Ichikawa et al. |
| 2002/0064613 | A1 | 5/2002 | Kugo et al. |
| 2003/0175507 | A1 | 9/2003 | Ikeda et al. |
| 2004/0043236 | A1 | 3/2004 | Kugo et al. |

FOREIGN PATENT DOCUMENTS

| EP | 1193284 A1 | 4/2002 |
| JP | 08020668   | 1/1996 |
| JP | 08253747   | 10/1996 |
| JP | 09169870   | 6/1997 |
| JP | 11263949   | 9/1999 |
| JP | 2002-114953| 4/2002 |

*Primary Examiner*—Betelhem Shewareged
(74) *Attorney, Agent, or Firm*—Cooper & Dunham LLP

(57) ABSTRACT

A heat-sensitive adhesive material contains a substrate and a heat-sensitive adhesive layer that contains a thermoplastic resin and a solid plasticizer, and the heat-sensitive adhesive material is so configured as to be heated and applied to an adherend, wherein the heat-sensitive adhesive material exhibits such an adhesive strength to the adherend as to increase with time from immediately after applying the heat-sensitive adhesive material to the adherend.

17 Claims, 5 Drawing Sheets

HEAT-SENSITIVE ADHESIVE MATERIAL, ADHERED ARTICLE, PROCESS AND APPARATUS FOR THERMALLY ACTIVATING THE HEAT-SENSITIVE ADHESIVE MATERIAL

BACKGROUND OF THE INVENTION

1. Field of the Invention

The present invention relates to heat-sensitive adhesive materials which can be applied to a variety of adherends such as resinous adherends, are typically useful in the field of point-of-sale (POS) systems in food industry, do not require a release paper (liner), are non-adhesive before application (thermal activation) but become adhesive upon thermal activation and are suitable as liner-less labels. It also relates to an article adhered with the heat-sensitive adhesive material, and a process and apparatus for efficiently thermally activating the heat-sensitive adhesive material.

2. Description of the Related Art

Adhesive sheets have been increasingly used in labels such as labels for indicating price, trade description (bar codes), quality, measure or advertisement (stickers). Conventional adhesive sheets each with a release paper and an adhesive layer laminated on the side opposite to the information recording side of such labels have been widely used, since these adhesive sheets can be easily applied to an adherend only by removing the release paper and pressing the adhesive sheets onto the adherend.

The release papers of these conventional adhesive sheets must be removed before use, which complicates application procedures. The release papers removed before use are not recycled and are disposed in most cases. The adhesive layer (pressure-sensitive adhesive layer) has tackiness or adhesiveness and is very difficult to handle after removal of the release paper. For example, when an adhesive sheet is placed on an adherend accidentally and an attempt is made to remove the adhesive sheet in order to apply the same properly, the adhesive sheet becomes curled or wrinkled and breaks at worse.

As a promising candidate for solving the problems, heat-sensitive adhesive sheets that do not exhibit adhesiveness at room temperature and do not require release papers have received attention. Such heat-sensitive adhesives comprise, for example, a solid plasticizer and a thermoplastic resin emulsion as essential components and may contain a tackifier and other additives. This type of heat-sensitive adhesives is applied to a side of a substrate opposite to a printing or recording surface and thereby yields a heat-sensitive adhesive material. The surface of an adhesive layer of the heat-sensitive adhesive material exhibits no adhesiveness or tackiness at room temperature, but is capable of exhibiting adhesiveness when heated and keeps its adhesiveness for a while after heating. Certain heat-sensitive adhesive materials comprise a liquid plasticizer instead of the solid plasticizer. The liquid plasticizer is generally encapsulated in microcapsules, and the shell (microcapsules) breaks or allows the liquid plasticizer to pass therethrough by heating, and the liquid plasticizer dissolves the thermoplastic resin emulsion and the tackifier to thereby exhibit adhesiveness, as in the solid plasticizer. These heat-sensitive adhesive materials containing a solid plasticizer or a liquid plasticizer do not require release papers and are advantageous in resource saving and environmental protection, in contrast to the conventional adhesive materials.

However, such conventional heat-sensitive adhesive materials have the following problems.

Plastic wrap for use in, for example, food in point-of-sale (POS) systems has been changed from poly(vinyl chloride) wrap to polyolefinic wrap to avoid dioxins and other environmental issues. POS labels are applied to such polyolefinic wrap, but exhibit much lower adhesiveness to and wettability with the polyolefinic wrap than the poly(vinyl chloride) wrap and are often delaminated.

In addition, the heat-sensitive adhesive materials have insufficient adhesiveness to polyolefinic wrap. This is because the polyolefinic wrap includes less additives such as plasticizers and stabilizers and thereby exhibits less wettability than the poly(vinyl chloride) wrap. These heat-sensitive adhesive materials are also used in labels for envelopes made of a nonwoven fabric of polyethylene or another polyolefin. In this case, they also exhibit insufficient adhesiveness to polyolefin nonwoven fabrics such as envelopes.

To solve this problem, the use of a phthalate compound as the solid plasticizer (Japanese Patent Application Laid-Open (JP-A) No. 08-20668) and the use of a dihydric or polyhydric alcohol in combination with an ester compound comprising an aromatic monobasic acid (JP-A No. 08-253747) have been proposed, but these techniques are still insufficient.

The adhesive strength of the heat-sensitive adhesive material to an adherend decreases with time. As a possible solution to this problem, JP-A No. 09-169870 proposes the use of an ester compound containing a polyhydric alcohol and an aromatic monobasic acid as a crystallization retarder for inhibiting the crystallization of the solid plasticizer. However, this technique is still insufficient to solve the problem.

The heat-sensitive adhesive material cannot substantially be applied again to the adherend after initial application. To solve this problem, the adhesive strength of the adhesive layer of the heat-sensitive adhesive material should be somewhat low immediately after thermal activation of the adhesive layer, which allows the heat-sensitive adhesive material to be reapplied to the adherend, and increase with time to firmly stick to the adherend and to thereby prevent delamination. However, a heat-sensitive adhesive material having such adhesive properties has not yet been provided in practical use.

OBJECTS AND ADVANTAGES

Accordingly, an object of the present invention is to provide a heat-sensitive adhesive material that can be applied to adherends made of various materials such as resins and can be applied to polyolefin wrap used in the field of food POS as well as polyolefin nonwoven fabrics such as envelopes. Another object of the present invention is to provide a heat-sensitive adhesive material that does not require a release paper (liner), does not exhibit adhesiveness before application and exhibits suitably controlled adhesiveness (adhesive strength) upon application (thermal activation). Still another object of the present invention is to provide a heat-sensitive adhesive material that exhibits a low adhesive strength to an adherend immediately after application, thus allowing the material to be reapplied and avoiding application failure, and exhibits an increasing adhesive strength with time, thus preventing the material from delaminating from the adherend and allowing desired information to be recorded or printed thereon. Yet another object of the present invention is to provide an article including an adherend and the heat-sensitive adhesive material applied thereto, a process and apparatus for efficiently activating the heat-sensitive adhesive material.

SUMMARY OF THE INVENTION

The present invention which achieves the above objects is as follows.

<1> Specifically, the present invention provides a heat-sensitive adhesive material including a substrate, and a heat-sensitive adhesive layer containing a thermoplastic resin and a solid plasticizer and being so configured as to be heated and applied to an adherend, wherein the heat-sensitive adhesive material exhibits such an adhesive strength to the adherend as to increase with time from immediately after applying the heat-sensitive adhesive material to the adherend.

The heat-sensitive adhesive layer of the above heat-sensitive adhesive material does not exhibit flowability and thereby does not exhibit adhesiveness before application of the heat-sensitive adhesive material, i.e., before heating, since the solid plasticizer contained therein is solid before heating. Upon heating the heat-sensitive adhesive material, the solid plasticizer fuses, the heat-sensitive adhesive layer is thermally activated, becomes flowable and exhibits adhesiveness. Namely, the heat-sensitive adhesive layer of the heat-sensitive adhesive material is thermally activated, exhibits adhesiveness and becomes applicable to an adherend only after heating. This adhesive layer does not exhibit adhesiveness before application (heating) and does not require a release paper (liner) and can be used without liner. Such a liner-less structure may be achieved by an adhesive material having such an adhesive layer and a surface composed of a material with low surface tension, which adhesive material is wound up in the form of a roll. However, desired information cannot be recorded or printed on the surface thereof in this case. In contrast, the heat-sensitive adhesive material of the present invention allows desired information to be recorded or printed on its surface which does not carry a liner. In the heat-sensitive adhesive material, an area of the heat-sensitive adhesive layer corresponding to a heated region is thermally activated to exhibit adhesiveness. Thus, the adhesive strength of the heat-sensitive adhesive layer can be appropriately controlled by controlling the region to be heated.

The adhesive strength of the heat-sensitive adhesive layer increases with time from immediately after applying the heat-sensitive adhesive material to the adherend. More specifically, immediately after heating (e.g., two minutes later), the solid plasticizer in the heat-sensitive adhesive layer fuses, and thereby the thermoplastic resin fuses and becomes flowable. Thus, the heat-sensitive adhesive material can be peeled off from the adherend. Even if the heat-sensitive adhesive material is applied to the adherend by mistake, it can be re-applied. After a lapse of a certain period of time after heating (e.g., 24 hours later), the solid plasticizer is gradually cooled, is solidified and exhibits substantially no flowability. Thus, the heat-sensitive adhesive material is firmly bonded to the adherend without delamination and does not decrease in its adhesive strength with time, in contrast to conventional heat-sensitive adhesive materials.

<2> The present invention further provides a heat-sensitive adhesive material including a substrate, and a heat-sensitive adhesive layer containing at least one thermoplastic resin and at least one solid plasticizer and being so configured as to be heated and applied to an adherend, the at least one solid plasticizer being solid at room temperature and capable of being fused or softened upon heating to thereby become compatible with the thermoplastic resin, wherein, when the pressure-sensitive adhesive layer is applied to the adherend and the adhesive strength to peel off the heat-sensitive adhesive layer from the adherend is determined according to a measuring procedure specified in the adhesive tape/adhesive sheet test method in Japanese Industrial Standards (JIS) Z0237, the heat-sensitive adhesive layer exhibits an adhesive strength of 300 gf/40-mm or less to peel off from the adherend two minutes after the application, and an adhesive strength of 500 gf/40-mm or more to peel off from the adherend 24 hours after the application.

By this configuration, similar advantages to above can also be obtained.

<3> The present invention also relates to a heat-sensitive adhesive material including a substrate, and a heat-sensitive adhesive layer containing a thermoplastic resin and a solid plasticizer and being so configured as to be heated and applied to an adherend, the solid plasticizer being solid at room temperature and capable of being fused or softened upon heating to thereby become compatible with the thermoplastic resin, wherein the pressure-sensitive adhesive layer exhibits an adhesive strength of 300 gf/40-mm or less to peel off from the adherend two minutes after the application, and an adhesive strength of 500 gf/40-mm or more to peel off from the adherend 24 hours after the application, as determined in a manner where the heat-sensitive adhesive layer is cut into a rectangular piece 4.0 cm wide and 9.0 cm long, is thermally activated by a thermal head at a thermal energy of 0.45 mJ/dot, a print speed of 4 ms/line and a platen pressure of 6 kgf/line, is applied, while pressing at a pressure of 2 kg using a rubber roller, to a polyethylene nonwoven fabric and is peeled off therefrom at a peel angle of 180 degrees and a peel speed of 300 mm/min.

By this configuration, similar advantages to above can also be obtained.

<4> The solid plasticizer may include at least two different benzotriazole derivatives.

By this configuration, the heat-sensitive adhesive layer exhibits a low adhesive strength immediately after heating, and the heat-sensitive adhesive material can be peeled off and re-applied to the adherend easily. With the lapse of time after the application, the heat-sensitive adhesive material exhibits an increasing adhesive strength and can be firmly bonded to a variety of adherends such as polyolefinic wrap and nonwoven fabrics including envelopes and hardly peeled off therefrom.

<5> The benzotriazole derivatives may be selected from compounds represented by following Formula (A):

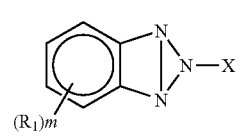

Formula (A)

wherein $R_1$ is one of a hydrogen atom, a halogen atom and an alkyl group; m is an integer of 1 to 4; and X is one of a hydrogen atom, an alkyl group, an aryl group, an aralkyl group and a group represented by following Formula (B):

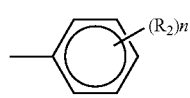

Formula (B)

wherein $R_2$ is one of a hydrogen atom, a halogen atom, an alkyl group and hydroxyl group; and n is an integer of 1 to 5.

The solid plasticizer contains specific benzotriazole derivatives, and the heat-sensitive adhesive layer exhibits a low adhesive strength immediately after heating, and the heat-sensitive adhesive material can be peeled off and re-applied to the adherend easily. With the lapse of time after the application, the heat-sensitive adhesive material exhibits an increasing adhesive strength and can be firmly bonded to a variety of adherends such as polyolefinic wrap and nonwoven fabrics including envelopes and hardly peeled off therefrom.

<6> The at least two different benzotriazole derivatives may be selected from compounds represented by following Formulae (I), (II), (III), (IV) and (V).

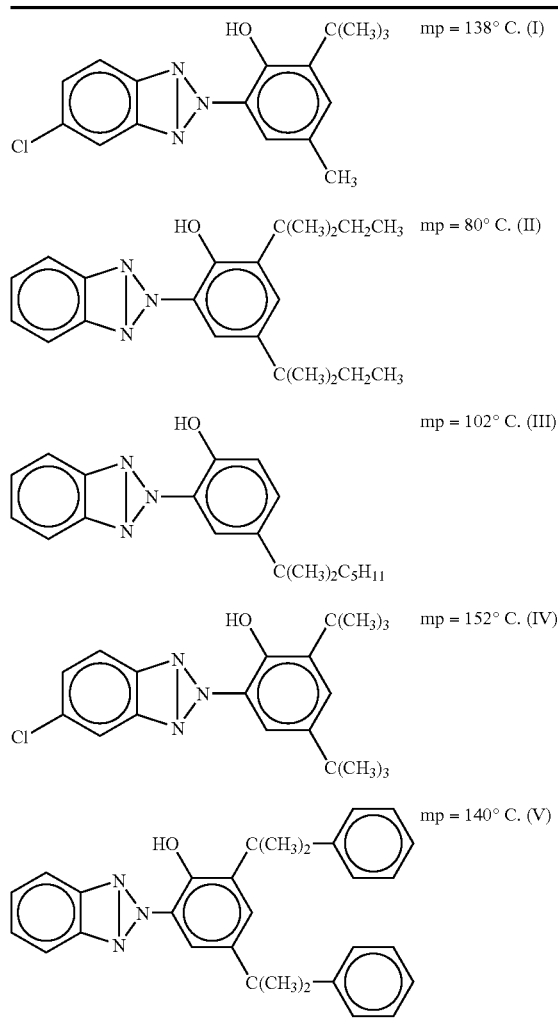

<7> One of the at least two different benzotriazole derivatives is preferably the compound represented by Formula (I).

<8> The at least two different benzotriazole derivatives may include the compound represented by Formula (I) and the compound represented by Formula 5 (IV).

<9> The difference in melting point between the at least two different benzotriazole derivatives is preferably 30° C. or more.

<10> The solid plasticizer is preferably dispersed in the heat-sensitive adhesive layer as particles having an average particle diameter of 10 µm or less.

<11> At least one of the heat-sensitive adhesive layer and an adjacent layer thereto may contain a supercooling-improving agent.

<12> The supercooling-improving agent is preferably dispersed in the at least one of the heat-sensitive adhesive layer and an adjacent layer thereto as particles having an average particle diameter of 10 µm or less.

<13> The heat-sensitive adhesive layer preferably further contains a tackifier.

<14> The heat-sensitive adhesive material may further include a recording layer on the opposite side of the substrate to the heat-sensitive adhesive layer.

<15> The recording layer may be at least one of a thermal recording layer, an ink-jet recording layer and an electrophotographic recording layer.

<16> The heat-sensitive adhesive material may further include a heat-insulating layer between the substrate and the recording layer, or, between the substrate and the heat-sensitive adhesive layer.

<17> The heat-insulating layer may include hollow particles containing a thermoplastic resin as a sheath and having a percentage of hollowness of 30% or more.

<18> The heat-sensitive adhesive material may be cut into pieces before use.

<19> The heat-sensitive adhesive material may have notches.

<20> The heat-sensitive adhesive material may be applied to a polyethylene nonwoven fabric.

<21> The heat-sensitive adhesive material may be wound in the form of a roll.

<22> The present invention further provides an article containing an adherend and the aforementioned heat-sensitive adhesive material whose heat-sensitive adhesive layer is applied to the adherend.

Even when the adherend is a polyolefin wrap such as film or sheet or a polyolefinic nonwoven fabric such as envelop, the heat-sensitive adhesive material exhibits a high adhesive strength and is not peeled off or delaminated from the adherend. Thus, the article has high durability in use.

<23> The present invention also provides a process for thermally activating the heat-sensitive adhesive material, the process including bringing a heating unit into contact with a heat-sensitive adhesive layer of the heat-sensitive adhesive layer to thereby thermally activating the heat-sensitive adhesive layer.

According to this process, the heat-sensitive adhesive layer of the heat-sensitive adhesive material exhibits adhesiveness only after thermal activation with the heating unit.

<24> The heat-sensitive adhesive layer may be thermally activated after cutting the heat-sensitive adhesive material.

<25> The heat-sensitive adhesive material may be cut before or after recording information on the recording layer.

<26> The process may further include applying the thermally activated heat-sensitive adhesive layer to the adherend.

<27> In addition and advantageously, the present invention provides an apparatus for thermally activating a heat-sensitive adhesive material, the apparatus holding or housing the heat-sensitive adhesive material, and containing at least a heating unit which is so configured as to come into contact with a heat-sensitive adhesive layer of the heat-sensitive adhesive material to thereby thermally activating the heat-sensitive adhesive layer, wherein the heat-sensitive adhesive material is the aforementioned heat-sensitive adhesive material.

In the apparatus, the heat-sensitive adhesive layer of the heat-sensitive adhesive material exhibits adhesiveness only after thermal activation with the heating unit.

<28> The heating unit may include a ceramic substrate, a resistor and a protective layer arranged in this order and may be so configured as to control the heating temperature by changing power applied to the resistor.

<29> The heating unit may be at least one of a thermal head and a thin-film heater.

<30> In the apparatus, the heat-sensitive adhesive material may further include a recording layer on the opposite side of the substrate to the heat-sensitive adhesive layer, and the apparatus may further include a recording unit for recording information on the recording layer.

<31> The recording device may record information according to any one of thermal recording, ink-jet recording and electrophotographic recording.

<32> The recording device may have a thermal head and a platen roll.

<33> The apparatus may further have a holding unit for holding the heat-sensitive adhesive material.

<34> The apparatus may further have a cutting unit for cutting the heat-sensitive adhesive material.

<35> The cutting unit may be arranged in one of between the holding unit and the heating unit, and between the holding unit and the heating unit.

<36> The recording unit may be arranged between the holding unit and the cutting unit.

Further objects, features and advantages of the present invention will become apparent from the following description of the preferred embodiments with reference to the attached drawings.

DESCRIPTION OF THE PREFERRED EMBODIMENTS

Figure 1:
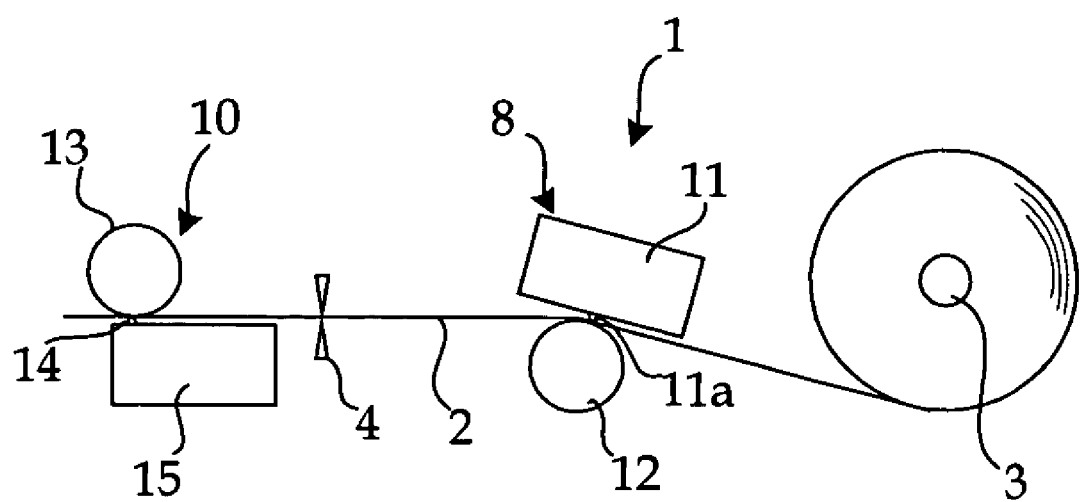
FIG. 1 is a schematic diagram showing an example of an apparatus for thermally activating a heat-sensitive adhesive material according to the present invention.

The heat-sensitive adhesive material of the present invention comprises a substrate and a heat-sensitive adhesive layer arranged on or above the substrate and may further comprise one or more other layers according to necessity, in which the heat-sensitive adhesive material exhibits such an adhesive strength to an adherend as to increase with time from immediately after applying the heat-sensitive adhesive material to the adherend.

The meaning of the phrase "the heat-sensitive adhesive material exhibits such an adhesive strength to the adherend as to increase with time from immediately after applying the heat-sensitive adhesive material to the adherend" is as follows. Specifically, when the pressure-sensitive adhesive layer is applied to the adherend and the adhesive strength to peel off the heat-sensitive adhesive layer from the adherend is determined according to a measuring procedure specified in the adhesive tape/adhesive sheet test method in Japanese Industrial Standards (JIS) Z0237, the heat-sensitive adhesive layer exhibits an adhesive strength of 300 gf/40-mm or less to peel off from the adherend two minutes after the application, and an adhesive strength of 500 gf/40-mm or more to peel off from the adherend 24 hours after the application. More specifically, the pressure-sensitive adhesive layer exhibits an adhesive strength of 300 gf/40-mm or less, preferably 200 gf/40-mm or less, to peel off from the adherend two minutes after the application, and an adhesive strength of 500 gf/40-mm or more, preferably 600 gf/40-mm or more, to peel off from the adherend 24 hours after the application, as determined in a manner where the heat-sensitive adhesive layer is cut into a rectangular piece 4.0 cm wide and 9.0 cm long, is thermally activated by a thermal head at a thermal energy of 0.45 mJ/dot, a print speed of 4 ms/line and a platen pressure of 6 kgf/line, is applied, while pressing at a pressure of 2 kg using a rubber roller, to a polyethylene nonwoven fabric and is peeled off therefrom at a peel angle of 180 degrees and a peel speed of 300 mm/min.

By allowing the heat-sensitive adhesive layer to have an adhesive strength to peel off from the adherend two minutes after the application of 300 gf/40-mm or less, the sensitive adhesive material can be easily peeled off from the adherent immediately after its application. By allowing the heat-sensitive adhesive layer to have an adhesive strength to peel off from the adherend twenty four hours after the application of 500 gf/40-mm or more, the heat-sensitive adhesive material exhibits a high adhesive strength and is hardly peeled off from the adherend after a lapse of a certain time period from the application.

In the heat-sensitive adhesive material, the adhesive strength to the adherend is preferably 300 gf/40-mm or less even after a lapse of six hours and is more preferably 300 gf/40-mm or less even after a lapse of three hours. The adhesive strength is preferably 500 gf/40-mm or more after a lapse of twelve hours, and is more preferably 500 gf/40-mm or more after a lapse of eight hours.

The polyethylene nonwoven fabric may have a gas permeability of 10 to 53 according to JIS P8117, and a suitable example thereof is commercially available under the trade name of Tyvek 1073D (hard type) from Du Pont-Asahi Flash Spun Products Co., Ltd.

Heat-sensitive Adhesive Layer

The heat-sensitive adhesive layer comprises a solid plasticizer and a thermoplastic resin and may further comprise one or more other components according to necessity.

Solid Plasticizer

The solid plasticizer can be any suitable solid plasticizer that is solid at room temperature and fuses or becomes soft upon heating to thereby become compatible with the thermoplastic resin. By comprising the solid plasticizer, the heat-sensitive adhesive layer enables to maintain the state of "supercooling" longer than a heat-sensitive adhesive layer without a solid plasticizer.

A composition comprising a thermoplastic resin generally changes its structural state from solid to liquid with an application of heat, and the reverse change thereof, i.e., from liquid to solid, is occurred by cooling. When such composition comprises a solid plasticizer, the heated composition does not go straight back to solid state from liquid state even the composition is cooled down to the temperature under the melting point of the solid plasticizer and maintains the liquid (amorphous) state for a while. This maintained liquid state is "supercooling" mentioned above.

The solid plasticizer comprises preferably at least one and more preferably at least two different benzotriazole derivatives. By using the benzotriazole derivatives as the solid plasticizer, the heat-sensitive adhesive layer can have a sufficiently low (initial) adhesive strength immediately after thermal activation and can have a sufficiently increasing adhesive strength after a lapse of a certain period of time to inhibit peeling off of the heat-sensitive adhesive layer from the adherend.

The benzotriazole derivatives are not specifically limited, can be selected according to the purpose and include, for example, those described in JP-A No. 11-263949 and No. 11-269440. Suitable examples of the benzotriazole derivatives are compounds represented by following Formula (A).

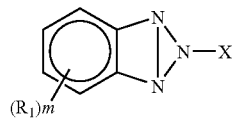

Formula (A)

In Formula (A), $R_1$ is a hydrogen atom, a halogen atom or an alkyl group. Examples of the halogen atom are fluorine, chlorine, bromine and iodine atoms. The repetition number m is an integer of 1 to 4, and X is hydrogen atom, an alkyl group, an aryl group, an aralkyl group or a group represented by following Formula (B). The alkyl group is not specifically limited and includes, for example, methyl group, ethyl group, propyl group and butyl group. The aryl group is not specifically limited and includes, for example, phenyl group and toluyl group.

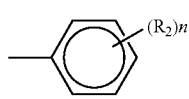

Formula (B)

In Formula (B), $R_2$ is a hydrogen atom, the halogen atom, the alkyl group or a hydroxyl group; and the repetition number n is an integer of 1 to 5.

Among compounds represented by Formula (A), the solid plasticizer comprises preferably at least one, and more preferably at least two compounds represented by following Formulae (I), (II), (III), (IV) and (V). Further preferably, the solid plasticizer comprises the compound of Formula (I) as one of the at least two different benzotriazole derivatives. Thus, the heat-sensitive adhesive layer can have a sufficiently low (initial) adhesive strength immediately after thermal activation and can have a sufficiently increasing adhesive strength after a lapse of a certain period of time to inhibit peeling off of the heat-sensitive adhesive layer from the adherend.

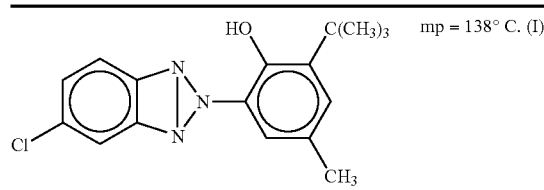

mp = 138° C. (I)

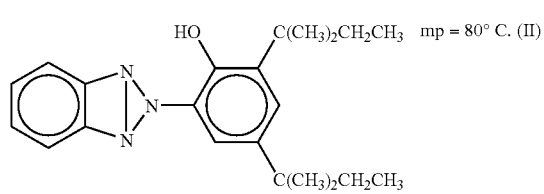

mp = 80° C. (II)

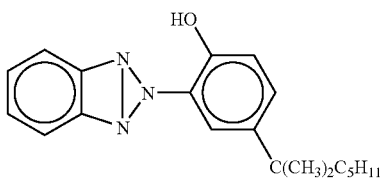

mp = 102° C. (III)

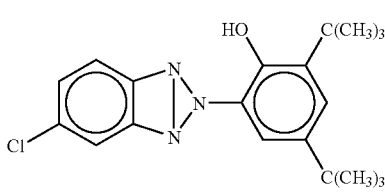

mp = 152° C. (IV)

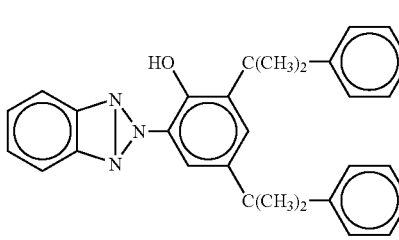

mp = 140° C. (V)

Among combinations of the at least two different benzotriazole derivatives of Formulae (I) through (V), a combination of the compound of Formula (I) and the compound of Formula (IV) is typically preferred. The difference in melting point between the at least two different benzotriazole derivatives is preferably 30° C. or more. In the case of the combination of the compound of Formula (I) and the compound of Formula (IV), however, the difference in melting point between the compounds is preferably less than 30° C.

The benzotriazole derivatives of Formulae (I) through (V) have the same substituent on the benzene ring of the group of Formula (B) and have a suitable difference in melting point. Thus, the resulting heat-sensitive adhesive layer can exhibit and maintain a high adhesiveness over a period of time and may show a higher adhesiveness due to their internal cohesion than other combinations of benzotriazole compounds.

The content of the benzotriazole derivatives in the heat-sensitive adhesive layer is not specifically limited and can be set according to the purpose. When at least two of the benzotriazole derivatives are used, the content thereof is preferably from 10% by mass to 80% by mass and more preferably from 30% by mass to 60% by mass.

The at least two different benzotriazole derivatives can be mixed in any proportions. When two different compounds are used, for example, the mass ratio of one to the other is preferably 9/1 to 1/9.

Examples of the solid plasticizer include, in addition to the benzotriazole derivatives of any of Formulae (I) through (V), benzotriazole derivatives represented by any of following Formulae (VI), (VII), (VIII), (IX) and (X).

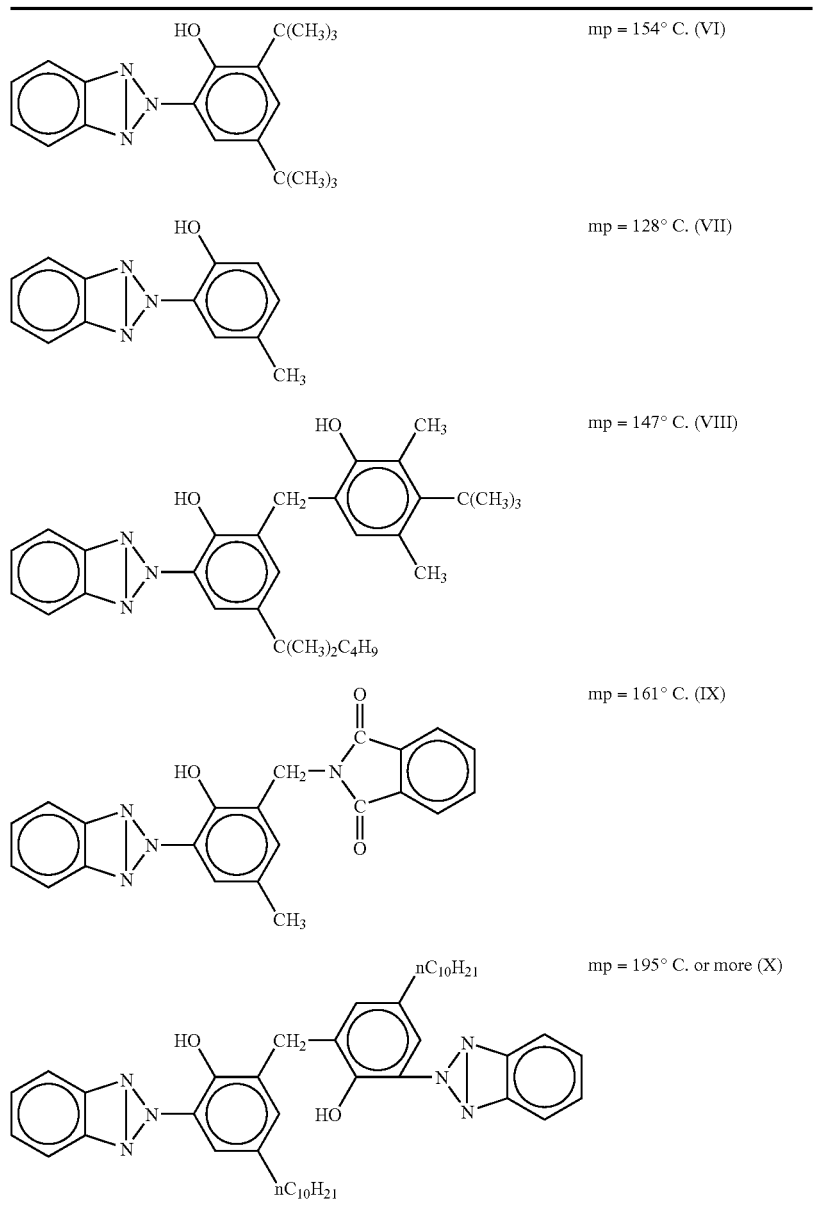

When at least two of the benzotriazole derivatives represented by any of Formulae (I) through (V) are used as the solid plasticizer in the heat-sensitive adhesive layer, the content of these benzotriazole derivatives in the heat-sensitive adhesive layer is preferably from 10% by lo mass to 80% by mass and more preferably form 30% by mass to 60% by mass.

At least one of the compounds represented by any of Formula (VI) through (X) is preferably used when at least two different benzotriazole derivatives are used in the 15 heat-sensitive adhesive layer. In this case, the content thereof is not specifically limited, can be set according to the purpose and is preferably 40% by mass or less, more preferably from 10% by mass to 40% by mass, and further preferably from 10 to 30% by mass.

The presence of the benzotriazole derivatives in the heat-sensitive adhesive layer can be detected, for example, in the following manner. Namely, the benzotriazole derivatives is extracted with an organic solvent from the heat-sensitive adhesive layer, fractionated according to an analytical procedure such as high-performance liquid chromatography or thin-layer chromatography, and their structures are analyzed by infrared spectrophotometry or NMR.

The solid plasticizer may be dispersed in the heat-sensitive adhesive layer as particles. The average particle diameter of the particles can be any suitable particle diameter and is preferably 10 μm or less, more preferably 5 μm or less, and further preferably 2 μm or less for better melting with heat and higher compatibility with the thermoplastic resin.

The total content of the solid plasticizer and the thermoplastic resin in the heat-sensitive adhesive layer is preferably 50% by mass or more, more preferably 60% by mass or more, and further preferably 70% by mass or more.

Thermoplastic Resin

The thermoplastic resin is not specifically limited, can be selected according to the purpose, and suitable examples thereof include those known as thermoplastic resin emulsions. Specific examples are (meth)acrylic ester copolymers, styrene-isoprene copolymers, styrene-acrylic ester copolymers, styrene-butadiene copolymers, acrylonitrile-butadiene copolymers, ethylene-vinyl acetate copolymers, vinyl acetate-acrylic ester copolymers, ethylene-vinyl chloride copolymers, ethylene-acrylic ester copolymers, vinyl acetate-ethylene-vinyl chloride terpolymers, vinyl acetate-ethylene-acrylic ester terpolymers, vinyl acetate-ethylene-styrene terpolymers, polybutadienes and polyurethanes. Each of these resins can be used alone or in combination. Among them, acrylic ester copolymers are preferred, of which 2-ethylhexyl acrylate is typically preferred for higher adhesiveness of the heat-sensitive adhesive layer.

Other Components

The heat-sensitive adhesive material may further comprise any of the other components according to necessity. Suitable examples are supercooling-improving agents, tackifiers, anti-blocking agents, cohesion improving agents, film-hardening agents, antiseptics, dyes and other colorants, developers, pH adjusters and antifoaming agents. Among them, supercooling-improving agents, tackifiers, anti-blocking agents and cohesion improving agents are preferred.

The supercooling-improving agent can be any suitable supercooling-improving agent that can serve to maintain supercooling of the mixture of the thermoplastic resin and the solid plasticizer in the heat-sensitive adhesive layer. Examples thereof are naphthol derivatives such as 2-benzyloxynaphthalene; biphenyl derivatives such as m-terphenyl, 4-acetylbiphenyl, p-benzylbiphenyl and 4-allyloxybiphenyl; polyether compounds such as 1,2-bis(3-methylphenoxy) ethane, 2,2'-bis(4-methoxyphenoxy)diethyl ether and bis(4-methoxyphenyl) ether; carbonic acid diester such as diphenyl carbonate; and oxalic acid diesters such as dibenzyl oxalate, di(p-chlorobenzyl) oxalate and di(p-methylbenzyl) oxalate. Each of these can be used alone or in combination. Among them, dibenzyl oxalate derivatives and biphenyl derivatives are preferred.

By incorporating the supercooling-improving agent into the heat-sensitive adhesive layer, the heat-sensitive adhesive layer can have higher flowability upon thermal activation by heating and can further satisfactorily solidify with a lapse of time. Thus, the anchor effect to the adherend due to higher flowability of the heat-sensitive adhesive layer upon heating can be increased, and the adhesive strength with a lapse of time to the adherend can be improved due to accelerated solidification of the heat-sensitive adhesive layer.

The supercooling-improving agent is preferably contained at least one of the heat-sensitive adhesive layer and its adjacent layer. When it is contained in the heat-sensitive adhesive layer, its content is preferably from 0.2 parts by mass to 2.0 parts by mass, and more preferably from 0.5 parts by mass to 1.5 parts by mass relative to 1.0 part by mass of the thermoplastic resin in the heat-sensitive adhesive layer.

By incorporating the supercooling-improving agent into the heat-sensitive adhesive layer and/or its adjacent layer, the heat-sensitive adhesive layer thermally activated by heating can satisfactorily keep its adhesiveness and can exhibit a high adhesive strength even at low temperatures.

The melting point of the supercooling-improving agent is not specifically limited, can be set according to the purpose and is preferably from 60° C. to 180° C. for efficiently lowering the melting point of the solid plasticizer.

The average particles diameter of dispersed particles of the supercooling-improving agent in the heat-sensitive adhesive layer is not specifically limited but is preferably 10 μm or less, more preferably 5 μm or less, and further preferably 2 μm or less for better melting with heat and higher compatibility with the thermoplastic resin.

The tackifier can be any tackifier such as terpene resins, aliphatic petroleum resins, aromatic petroleum resins, chroman-indene resins, styrenic resins, phenolic resins, terpene-phenol resins and rosin derivative resins. Each of these can be used alone or in combination.

The amount of the tackifier is preferably 2.0 parts by mass or less, and more preferably from 0.2 parts by mass to 1.5 parts by mass, relative to 1.0 part by mass of the thermoplastic resin.

If the amount of the tackifier is more than 2.0 parts by mass, the heat-sensitive adhesive material may invite blocking in some cases.

To prevent blocking, the anti-blocking agent is preferably used. Thus, blocking at high temperature and high humidity can be prevented more effectively.

The anti-blocking agent can be any anti-blocking agent such as a wax, and another heat-fusible material, as well as an inorganic filler.

The wax may be, for example, an animal wax, a vegetable wax or a synthetic wax, as well as a higher fatty acid, a higher fatty acid amide, a higher fatty acid anilide or an acetylated aromatic amine. Such waxes include, but are not limited to, animal- or vegetable-origin waxes, synthetic waxes, and other waxes; as well as higher fatty acids, higher fatty acid amides including N-hydroxymethylstearamide and stearamide, higher fatty acid anilides, acetylated products of aromatic amines, paraffin wax, Japan wax (sumac wax), carnauba wax, shellac, montan wax, oxidized paraffin, polyethylene wax, and oxidized polyethylene. The higher fatty acids include, for example, stearic acid and behenic acid. The higher fatty acid amides include, for example, stearamide, oleamide, N-methylstearamide, erucamide, methylol behenamide, methylol stearamide, methylene bis(stearamide), and ethylene bis(stearamide). The higher fatty acid anilides include, for example, stearic acid anilide and linolic acid anilide. The acetylated products of aromatic amines include, for example, acetotoluidide.

The other heat-fusible materials are not specifically limited, can be selected according to the purpose and are, for example, leuco dyes and developers.

The wax and other heat-fusible materials preferably have a high melting point to avoid adverse effects on the adhesive strength of the heat-sensitive adhesive layer.

The inorganic fillers include, but are not limited to, carbonates, oxides, hydroxides and sulfates of aluminium, zinc, calcium, magnesium, barium or titanium, as well as inorganic pigments including natural silica, zeolite, kaolin, calcined kaolin, and other clay. These inorganic fillers should preferably have an oil absorption as low as possible in order not to adversely affect the adhesive strength of the heat-sensitive adhesive layer.

The content of the anti-blocking agent in the heat-sensitive adhesive layer is preferably 1.5 parts by mass or less, and more preferably from 0.6 parts by mass to 1.0 part by mass, relative to 1.0 part by mass of the thermoplastic resin. If the content of the anti-blocking agent is more than 1.5 parts by mass, the heat-sensitive adhesive layer may have a decreased adhesive strength.

The cohesion improving agent serves to improve adhesion between the heat-sensitive adhesive layer and the substrate, and/or cohesion in the heat-sensitive adhesive layer. The cohesion improving agent can be any suitable cohesion improving agent such as a water-soluble or hydrophilic polymer binder.

Examples of the water-soluble or hydrophilic polymer binder are poly(vinyl alcohol)s, poly(vinyl acetate)s, oxidized starch, etherized starch, carboxymethyl cellulose, hydroxyethyl cellulose and other cellulose derivatives, casein, gelatin and sodium alginate.

The content of the cohesion improving agent in the heat-sensitive adhesive layer can be any suitable content such that the adhesive strength of the heat-sensitive adhesive material is not deteriorated, and is preferably 30% by mass or less, and more preferably 10% by mass or less to the total solid contents of the heat-sensitive adhesive layer.

The heat-sensitive adhesive layer can be prepared, for example, by applying a coating composition containing the aforementioned components to the substrate and drying the applied film.

The coating composition can be applied according to any procedure, such as wire bar coating, blade coating, curtain coating, die coating, spin coating, kneader coating or dip coating.

The thickness of the heat-sensitive adhesive layer is not specifically limited and is, for example, preferably from 2 μm to 30 μm and more preferably from 5 μm to 20 μm.

Substrate

The substrate is not specifically limited but is preferably a base paper.

The base paper may mainly comprise wood pulp and fillers.

Such wood pulp includes, but is not limited to, chemical pulp such as latifoliate tree bleached kraft pulp (LBKP) and needle-leafs tree bleached kraft pulp (NBKP); mechanical pulp such as groundwood pulp (GP), pressurized groundwood pulp (PGW), refiner mechanical pulp (RMP), thermomechanical pulp (TMP), chemithermomechanical pulp (CTMP), chemimechanical pulp (CMP) and chemigroundwoo,d pulp (CGP); and recycled fibers such as deinked pulp (DIP).

Examples of the fillers are conventional or known fillers such as pigments, binders, sizing agents, fixing agents, yield improvers, cationizing agents and paper-strength improvers.

Examples of the pigments are white inorganic pigments such as precipitate calcium carbonate light, calcium carbonate heavy, kaolin, talc, calcium sulfate, barium sulfate, titanium dioxide, zinc oxide, zinc sulfide, satin white, aluminium silicate, diatomaceous earth, calcium silicate, magnesium silicate, synthetic silica, aluminium hydroxide, alumina, lithopone, zeolite, magnesium carbonate, and magnesium hydroxide; organic pigments such as styrenic plastic pigments, acrylic plastic pigments, polyethylenes, microcapsules, urea resins, and melamine resins.

The base paper can be prepared by mixing the wood pulp and the fillers and subjecting the mixture to a conventional paper making machine.

Examples of the paper making machine are wire paper machine, cylinder paper machine, and twin wire paper machine. The base paper can be prepared under acidic, neutral, or basic conditions.

The base paper can be prepared by on-machine treatment using a calendering machine comprising, for example, a metallic roll and a synthetic resin roll. Alternatively, it can be prepared by off-machine treatment, and after the treatment, the resulting base paper may be subjected to calendering such as machine-calendering or supercalendering to thereby control its flatness.

The thickness of the substrate is not specifically limited and is generally from 60 μm to 300 μm.

Other Layers

The heat-sensitive adhesive material may further comprise one or more other layers, such as a heat-insulating layer (underlayer), a recording layer, and a protective layer.

Heat-insulating Layer (Underlayer)

The heat-insulating layer (underlayer) can be any suitable layer that contains airspace and has heat-insulative activity.

The heat-insulating layer (underlayer) can be arranged between the heat-sensitive adhesive layer and the substrate, and/or between the recording layer (especially in the case of the thermal recording layer) and the substrate. Thus, the thermal energy applied to the heat-sensitive adhesive layer for creating adhesiveness therein can be efficiently utilized while minimizing transfer of the heat to the substrate. When the recording layer, especially the thermal recording layer, is arranged on an opposite side of the substrate to the heat-sensitive adhesive layer and the heat-sensitive adhesive layer is heated at high energy, the energy reaches the thermal recording layer, and thus inviting problems such as background fog. The heat-insulating layer (underlayer) works to thermally insulate the thermal recording layer sufficiently, thus efficiently preventing background fog and other problems in the thermal recording layer.

The air rate (%), i.e., the ratio of airspace in the heat-insulating layer (underlayer), is not specifically limited and is preferably as high as possible, for efficient improvement in adhesive properties of the heat-sensitive adhesive layer.

The heat-insulating layer (underlayer) can be any form and is preferably a non-foamable layer comprising hollow particles. The hollow particles can be any suitable hollow particles, such as those comprising any of acrylic polymers and vinylidene chloride polymers.

The hollowness of the hollow particles is not specifically limited but is preferably 30% or more.

The heat-insulating layer (underlayer) can be prepared according to any known coating procedure such as blade coating, gravure coating, gravure-offset coating, bar coating, roll coating, knife coating, air knife coating, comma coating, U comma coating, AKKU coating, smoothing coating, microgravure coating, reverse roll coating, four- or five-roll coating, dip coating, curtain coating, slide coating or die coating.

Recording Layer

The recording layer can be any suitable recording layer on which information such as images can be recorded. Examples of the recording layer are a thermal recording layer, an ink-jet recording layer, and an electrophotographic recording layer.

The recording layer is preferably arranged on the opposite side of the substrate to the heat-sensitive adhesive layer.

On the recording layer, desired information in the form of, for example, an image or character can be recorded or printed in a single color such as black or in multiple colors (e.g., two colors, three colors or full colors). The printing procedure can be any suitable printing procedure and, for better antiblocking properties, is preferably UV printing using an ink containing an ultraviolet-curable resin.

Among these recording layers, the thermal recording layer (heat-sensitive color-developing layer) is preferred. By heating the thermal recording layer imagewise in addition to heating the heat-sensitive adhesive layer, a desired developed image can be formed or recorded on the thermal recording layer to thereby add values to the heat-sensitive adhesive material.

The thermal recording layer can be any suitable thermal recording layer. Preferably, it mainly comprises a leuco dye and a developer and further comprises, for example, a binder, a sensitizer and other additives.

Suitable leuco dye include, but are not specifically limited to, basic leuco dyes.

Examples of the basic leuco dyes are fluoran compounds, triarylmethane compounds, spiro compounds, diphenylmethane compounds, thiazine compounds, lactam compounds, and fluorene compounds.

The fluoran compounds include, but are not limited to, 3-diethylamino-6-methyl-7-anilinofluoran, 3-dibutylamino-6-methyl-7-anilinofluoran, 3-(N-methyl-N-cyclohexylamino)-6-methyl-7-anilinofluoran, 3-(N-ethyl-N-isopentylamino)-6-methyl-7-anilinofluoran, 3-(N-isobutyl-N-ethylamino)-6-methyl-7-anilinofluoran, 3-[N-ethyl-N-(3-ethoxypropyl)amino]-6-methyl-7-anilinofluoran, 3-(N-ethyl-N-hexylamino)-6-methyl-7-anilinofluoran, 3-dipentylamino-6-methyl-7-anilinofluoran, 3-(N-methyl-N-propylamino)-6-methyl-7-anilinofluoran, 3-(N-ethyl-N-tetrahydrofurylamino)-6-methyl-7-anilinofluoran, 3-diethylamino-6-methyl-7-(p-chloroanilino)fluoran 3-diethylamino-6-methyl-7-(p-fluoroanilino)fluoran, 3-(p-toluidinoethylamino)-6-methyl-7-anilinofluoran, 3-diethylamino-6-methyl-7-(p-toluidino)fluoran, 3-diethylamino-7-(3,4-dichloroanilino)fluoran, 3-pyrrolidino-6-methyl-7-anilinofluoran, 3-diethylamino-6-chloro-7-ethoxyethylaminofluoran, 3-diethylamino-6-chloro-7-anilinofluoran, 3-diethylamino-7-phenylfluoran and 3-(p-toluidinoethylamino)-6-methyl-7-phenethylfluoran.

The triarylmethane compounds include, but are not limited to, 3,3-bis(p-dimethylaminophenyl)-6-dimethylaminophthalide (i.e., crystal violet lactone (CVL)), 3,3-bis(p-dimethylaminophenyl)phthalide, 3-(p-dimethylaminophenyl)-3-(1,2-dimethylaminoindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-5-dimethylaminophthalide, 3,3-bis(2-phenylindol-3-yl)-5-dimethylaminophthalide and 3-p-dimethylaminophenyl-3-(1-methylpyrrol-2-yl)-6-dimethylaminophthalide.

The spiro compounds include, but not limited to, 3-methylspirobi(naphthopyran), 3-ethylspirobi (naphthopyran), 3,3'-dichlorospirobi(naphthopyran), 3-benzylspirobi(naphthopyran), 3-propylspirobenzopyran, 3-methylnaphtho-(3-methoxybenzo)spiropyran and 1,3,3-trimethyl-6-nitro-8'-methoxyspiro (indoline-2,2'-benzopyran).

The diphenylmethane compounds include, for example, N-halophenyl-leucoauramines, 4,4-bis(dimethylaminophenyl)benzhydryl benzyl ether and N-2,4,5-trichlorophenylleucoauramine.

The thiazine compounds include, for example, benzoyl Leucomethylene Blue and p-nitrobenzoyl Leucomethylene Blue.

The lactam compounds include, for example, Rhodamine B anilinolactam and Rhodamine B p-chloroanilinolactam.

The fluorene compounds include, but are not limited to, 3,6-bis(dimethylamino)fluorene-spiro(9,3')-6'-dimethylaminophthalide, 3,6-bis(dimethylamino)fluorene-spiro(9,3')-6'-pyrrolidinophthalide and 3-dimethylamino-6-diethylaminofluorene-spiro(9,3')-6'-pyrrolidinophthalide.

Color-developable basic leuco dyes include, but are not limited to, 3-diethylamino-6-methyl-7-chlorofluoran, 3-cyclohexylamino-6-chlorofluoran, 3-diethylamino-benzo[α]fluoran, 3-dibutylamino-benzo[α]fluoran, 3-diethylamino-7-chlorofluoran, 3-diethylamino-7-methylfluoran, 3-N-ethyl-N-isoamylamino-benzo[α]fluoran, 3-N-ethyl-N-p-methylphenylamino-7-methylfluoran, 3-diethylamino-6,8-dimethylfluoran, 3-dibutylamino-6-methyl-7-bromof luoran, 3,6-bis(diethylaminofluoran)-γ-(4'-nitro)anilinolactam, bis (1-n-butyl-2-methylindol-3-yl)phthalide, bis (1-ethyl-2-methylindol-3-yl)phthalide, 3-(4-diethylaminophenyl)-3-(1-ethyl-2-methylindol-3-yl)phthalide, 3-(4-diethylamino-2-ethoxyphenyl)-3-(1-ethyl-2-methylindol-3-yl)-4-azaphthalide, 3-(4-diethylaminophenyl) -3-(1-ethyl-2-methylindol-3-yl)phthalide, 3-(4-diethylamino-2-methylphenyl)-3-(1-ethyl-2-methylindol-3-yl)phthalide, 3,3-bis(4-dimethylaminophenyl)-6-diethylaminophthalide, 3,7-bis(4-dimethylamino)-10-benzoylphenothiazine, 3,3-bis(4-diethylamino-6-ethoxyphenyl)-4-azaphthalide, 3-diethylamino-7-dianilinofluoran, 3-N-ethyl-N-4-methylphenylamino-7-N-methylanilinofluoran, 3-diethylamino-7-N-dibenzylaminofluoran, 3,6-dimethoxyfluoran, 3,6-dibutoxyfluoran, 3'-methoxy-4'-ethoxyphenyl-2-styrylquinoline, and 2',4'-dioctyloxyphenyl-2-styrylquinoline.

Examples of the developer are those generally used in pressure-sensitive or thermal (heat-sensitive) recording paper. Specific examples are bis(3-allyl-4-hydroxyphenyl) sulfone, alpha-naphthol, beta-naphthol, p-octylphenol, 4-t-octylphenol, p-t-butylphenol, p-phenylphenol, 1,1-bis(p-hydroxyphenyl)propane, 2,2-bis(p-hydroxyphenyl)propane (i.e., bisphenol A or BPA), 2,2-bis(p-hydroxyphenyl)butane, 1,1-bis(p-hydroxyphenyl)cyclohexane, 4,4'-thiobisphenol, 4,4'-cyclohexylidenediphenol, 2,2'-(2,5-dibromo-4-hydroxyphenyl)propane, 4,4-isopropylidenebis(2-t-butylphenol), 2,2'-methylenebis(4-chlorophenol), 4,4'-dihydroxydiphenyl sulfone, 4-hydroxy-4'-methoxydiphenyl sulfone, 4-hydroxy-4'-ethoxydiphenyl sulfone, 4-hydroxy-4'-isopropoxydiphenyl sulfone, 4-hydroxy-4'-buroxydiphenyl sulfone, methyl bis(4-hydroxyphenyl)acetate, butyl bis (4-hydroxyphenyl) acetate, benzyl bis (4-hydroxyphenyl) acetate, 2,4-dihydroxy-2'-methoxybenzanilide, and other phenolic compounds; benzyl p-hydroxybenzoate, ethyl p-hydroxybenzoate, dibenzyl 4-hydroxyphthalate, dimethyl 4-hydroxyphthalate, ethyl 5-hydroxyisophthalate, 3,5-di-t-butylsalicylic acid, 3,5-di-α-methylbenzylsalicylic acid, and other aromatic carboxylic acid derivatives, aromatic carboxylic acids and metal salts thereof.

The binder can be any suitable binder, and examples thereof are starches, hydroxyethylcellulose, methylcellulose, ethylcellulose, carboxymethylcellulose, and other cellulose derivatives, casein, gelatin, and other proteins, oxidized starch, esterified starch, other polysaccharides and other hydrophilic or water-soluble natural high-molecular compounds; poly(vinyl alcohol)s, modified poly(vinyl alcohol)s, polyvinylpyrrolidones, poly(acrylic acid)s, poly(sodium acrylate)s, acrylamide-acrylic ester copolymers, acrylamide-acrylate-methacrylic acid terpolymers, alkali salts of styrene-maleic anhydride copolymers, latices, polyacrylamides, styrene-maleic anhydride copolymers, and other water-soluble synthetic high-molecular compounds and latices; alkali salts of ethylene-maleic anhydride copolymers, and other water-soluble adhesive resins and latices, alkali salts of ethylene-maleic anhydride copolymers, and other water-soluble adhesive resins; latices of poly(vinyl acetate)s, polyurethanes, poly(acrylic ester)s, styrene-butadiene copolymers, acrylonitrile-butadiene copolymers, methyl acrylate-butadiene copolymers, acrylonitrile-butadiene-acrylic acid terpolymers and ethylene-vinyl acetate copolymers.

The sensitizer (intensifier) is used for further improving the sensitivity of the thermal recording layer. Such sensitizers include, but are not limited to, N-hydroxymethylstearamide, stearamide, palmitamide, and other waxes; 2-benzyloxynaphthalene and other naphthol derivatives; acetylbiphenyl, p-benzylbiphenyl, 4-allyloxybiphenyl, and other biphenyl derivatives; 1,2-bis(3-methylphenoxy)ethane, 2,2'-bis(4-methoxyphenoxy) diethyl ether, bis(4-methoxyphenyl) ether, and other polyether compounds; diphenyl carbonate, dibenzyl oxalate, di(p-chlorobenzyl) oxalate, and other diester derivatives of carbonic acid or oxalic acid.

Examples of the pigment are diatomaceous earth, talc, kaolin, calcined kaolin, calcium carbonate, magnesium carbonate, titanium oxide, zinc oxide, silicon oxide, aluminium hydroxide, and urea-formaldehyde resins.

The recording layer can be prepared according to the aforementioned coating procedure.

Protective Layer

The protective layer may be formed on or above the recording layer for improving barrier properties, head matching, writability to a recording material and other properties of the recording layer.

The protective layer can be any suitable protective layer and is, for example, one mainly containing a pigment, a binder, a crosslinking agent and a lubricant.

The protective layer is suitably prepared according to the aforementioned coating procedure.

Use

The heat-sensitive adhesive material can be suitably cut before or after thermal activation (heating) of the heat-sensitive adhesive layer. In such a case, the heat-sensitive adhesive material may have notches formed previously. Thus, the heat-sensitive adhesive material can be advantageously used in labels, tags, and other various applications.

The heat-sensitive adhesive material may be in any form such as a sheet form or roll form.

The adherend to which the heat-sensitive adhesive material is applied is not specifically limited, and its size, shape, structure and material can be selected according to the purpose. Examples of the material of the adherend are sheets or plates comprising resins such as polyethylenes, polypropylenes and other polyolefins, acrylic resins, poly(ethylene terephthalate)s (PET), polystyrenes, and polyamides; sheets or plates comprising metals such as stainless steel and aluminum; paper products such as envelopes and corrugated fiberboard; polyolefin wrap; polyvinyl chloride wrap; and polyethylen nonwoven fabrics such as envelopes.

The heat-sensitive adhesive material exhibits an increasing and higher adhesive strength with time and can be advantageously applied even to the polyethylenic nonwoven fabrics such as envelopes, in contrast to conventional heat-sensitive adhesive materials.

The adhered article according to the present invention comprises the heat-sensitive adhesive material of the present invention applied to the adherend. The adhered article comprises the heat-sensitive adhesive material, thus exhibits a high adhesive strength without delamination and shows high durability during use, even if the adherend is a polyolefinic wrap such as film or sheet, or polyolefinic nonwoven fabric such as envelope.

The heat-sensitive adhesive layer of the heat-sensitive adhesive material can be thermally activated by any suitable heating unit such as hot air, a heat roller or a thermal head.

The heat-sensitive adhesive layer is preferably thermally activated by using a thermal head, and more preferably by the following method for thermally activating a heat-sensitive adhesive material according to the present invention. Thus, by heating the both sides of the heat-sensitive adhesive material using a conventional thermal recording printer, information can be recorded on the thermal recording layer and simultaneously, the heat-sensitive adhesive layer can be thermally activated.

The process for thermally activating the heat-sensitive adhesive material according to the present invention comprises the step of bringing a heating unit into contact with the heat-sensitive adhesive layer of the heat-sensitive adhesive material to thereby thermally activating the heat-sensitive adhesive layer and may further comprise, according to necessity, any of other steps, such as applying the thermally activated heat-sensitive adhesive layer to an adherend, cutting the heat-sensitive adhesive material and/or recording information on the recording layer.

The process for thermal activation can be suitably performed using the apparatus for thermally activating the heat-sensitive adhesive material according to the present invention. The apparatus holds or houses the heat-sensitive adhesive material of the present invention and comprises a heating unit which is so configured as to be in contact with the heat-sensitive adhesive layer of the heat-sensitive adhesive material to thereby thermally activate the heat-sensitive adhesive layer. The apparatus may further comprise, according to necessity, any of other unit such as an applying unit for applying the heat-sensitive adhesive layer to the adherend, a cutting unit for cutting the heat-sensitive adhesive material, and a recording unit for recording information on the recording layer.

The heating unit can be any suitable heating unit that can heat the heat-sensitive adhesive material. The heating unit preferably comprises a ceramic substrate, a resistor and a protective layer arranged in this order and is capable of controlling the heating temperature by changing a current or power applied to the resistor.

Suitable examples of the heating unit are a thermal head and a thin-film heater. A suitable thermal head or thin-film heater comprises a ceramic substrate and a band-like thick-film heat-generative resistor that has a crystallized glass protective layer for preventing abrasion and oxidization on its surface. For better thermal responsiveness, a glaze layer made of crystallized glass can be arranged under the heat-generative resistor. Such heating unit can easily control the thermal activation conditions and can thermally activate the material partially or locally according to necessity.

It is preferred that the heat-sensitive adhesive layer is thermally activated after cutting the heat-sensitive adhesive material using the cutting unit.

The recording unit can be any suitable unit that can record information on the recording layer and is preferably one according to thermal recording, ink-jet recording or electrophotographic recording.

The recording unit preferably has a thermal head and a platen roll. In this case, the thermal head can be brought into contact with the heat-sensitive adhesive layer sufficiently and can thereby thermally activate the heat-sensitive adhesive layer efficiently and surely. This heating unit can thermally activate the material simultaneously with energizing, while controlling the heating on-demand, thus reducing energy consumption for thermal activation.

The apparatus preferably further comprises a pressing member at an opposite position to a heating section having the thermal head, so as to sandwich and hold the heat-sensitive adhesive material together with the heating section. Thus, heat can more efficiently be transmitted from the heating section to the heat-sensitive adhesive layer of the heat-sensitive adhesive material to thereby accelerate the thermal activation of the heat-sensitive adhesive layer.

The heating section is preferably arranged near to the edge, at a corner edge or at the edge surface of the thermal head. It preferably has a release layer on its surface. Thus, the thermally activated heat-sensitive adhesive layer is prevented from coming into contact with the thermal head and components constituting the heat-sensitive adhesive layer are effectively prevented from sticking to the thermal head.

The recording unit can be arranged at any suitable position but is preferably arranged between the holding unit and the cutting unit mentioned below.

The cutting unit can be any suitable unit that can cut the heat-sensitive adhesive material, such as conventional cutting devices.

The cutting unit can be arranged at any suitable position but is preferably arranged between the holding unit and the heating unit and/or between the holding unit and the recording unit.

The heat-sensitive adhesive material is preferably cut by the cutting unit before or after recording information on the recording layer.

An embodiment of the process for thermally activating the heat-sensitive adhesive material using the apparatus for thermal activation will be illustrated with reference to the drawings.

Figure 2:
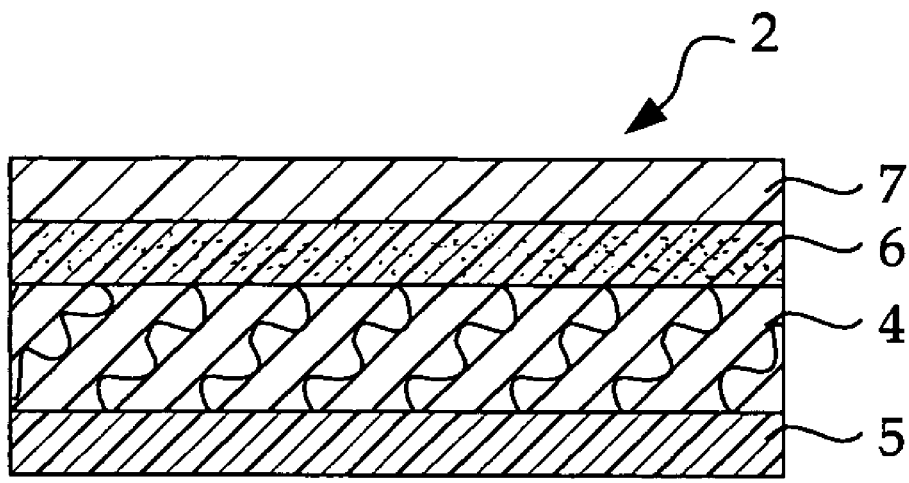
FIG. 2 is a schematic sectional view showing an example of a heat-sensitive adhesive material of the present invention.

FIG. 1 is a schematic diagram of an embodiment of an apparatus 1 for thermal activation, which has a printer function; and FIG. 2 is a schematic sectional view of an exemplary configuration of the heat-sensitive adhesive material 2.

The apparatus 1 comprises a holding unit 3 for holding the heat-sensitive adhesive material 2 wound in the form of a roll; a recording unit 8 for recording information on a thermal recording layer 7 of the heat-sensitive adhesive material 2; a cutter 9 as a cutting unit for cutting the heat-sensitive adhesive material 2 into pieces with desired sizes; and a unit 10 for thermally activating a heat-sensitive adhesive layer 5 of the heat-sensitive adhesive material 2.

The recording unit 8 includes a thermal head 11 and a platen roll 12. The device 10 includes a platen roll 13 and a thermal head 15. The platen roll 13 serves as a transporting unit for transporting the heat-sensitive adhesive material 2. The thermal head 15 servers as a heating unit and has a heating section 14. The heating section 14 comprises a ceramic substrate, a thin film of a heat-generative resistor arranged on the ceramic substrate, and a protective layer composed of crystallized glass arranged on the heat-generative resistor. The platen roll 13 also serves, together with the heating section 14, as a pressing member for sandwiching and holding the heat-sensitive adhesive material 2.

Figure 4:
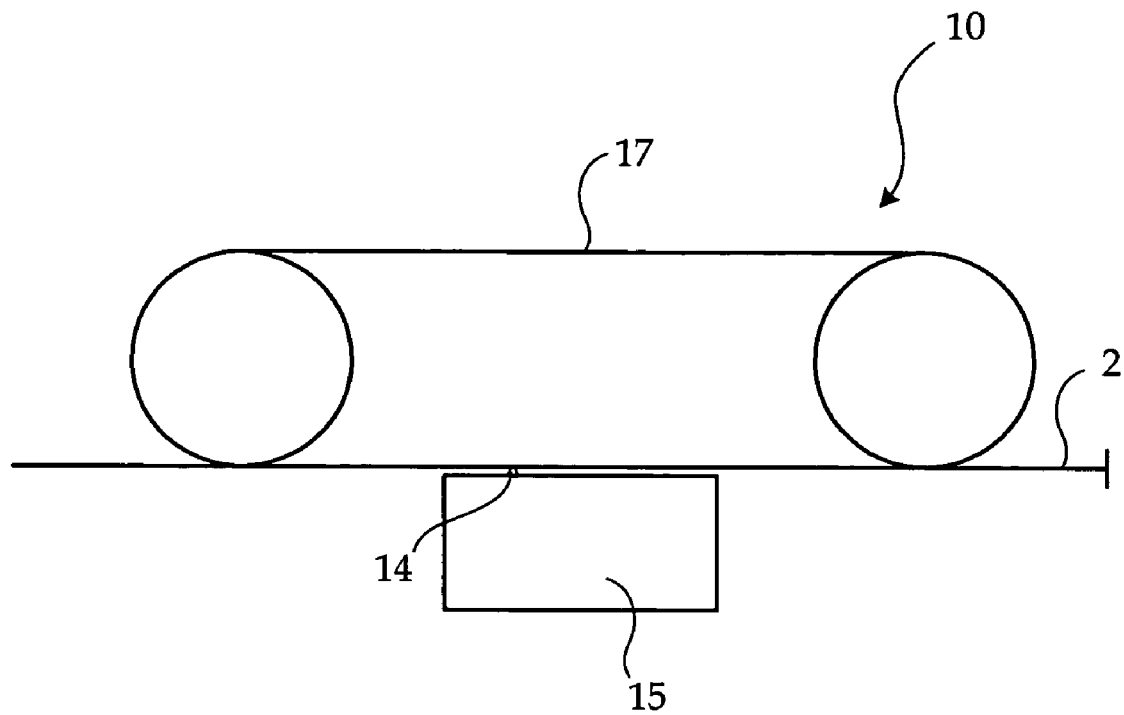
FIGS. 4 to 9 are each a schematic diagram showing another example of the apparatus, respectively.
Figure 5:
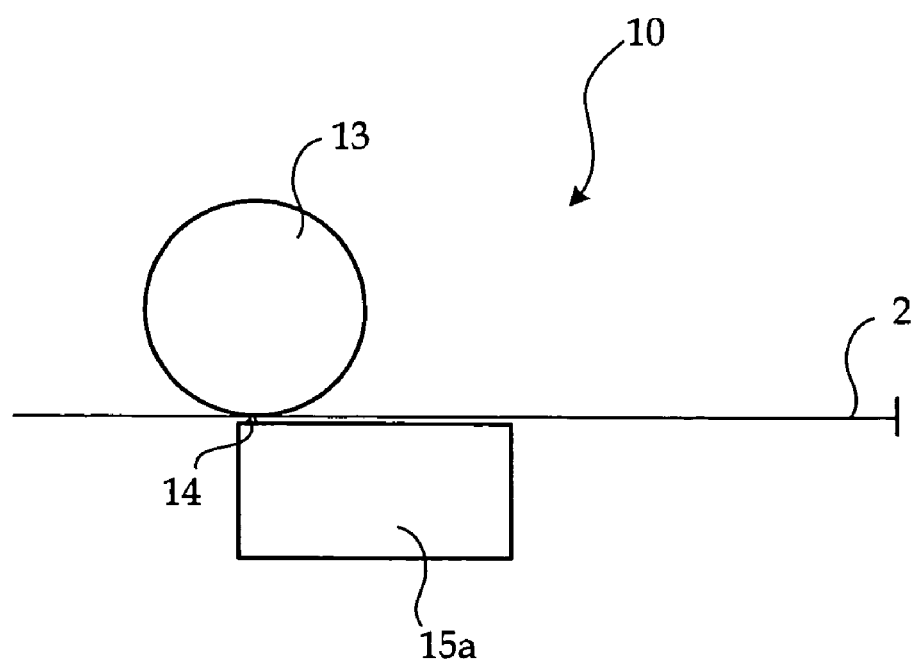
Figure 6:
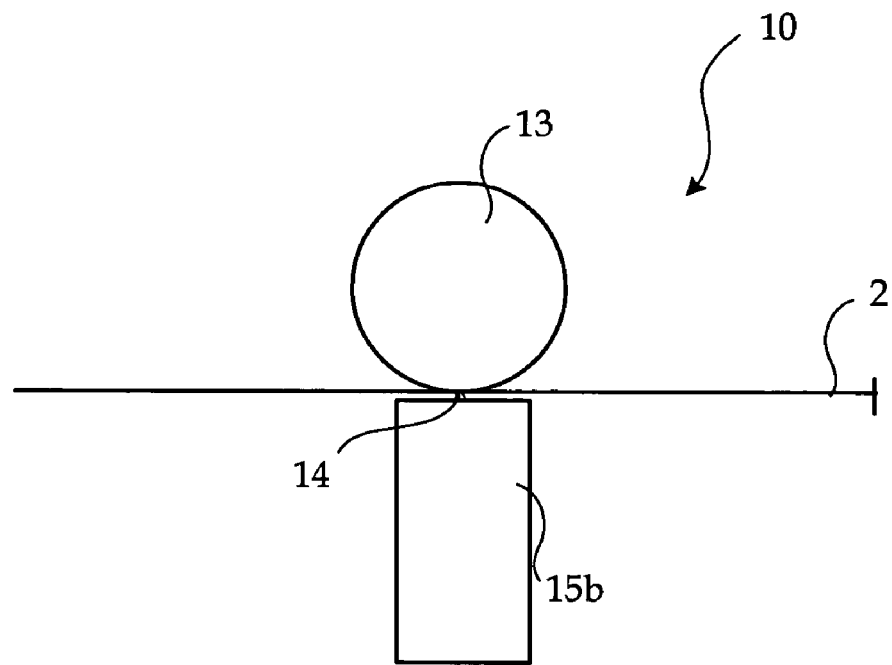
Figure 7:
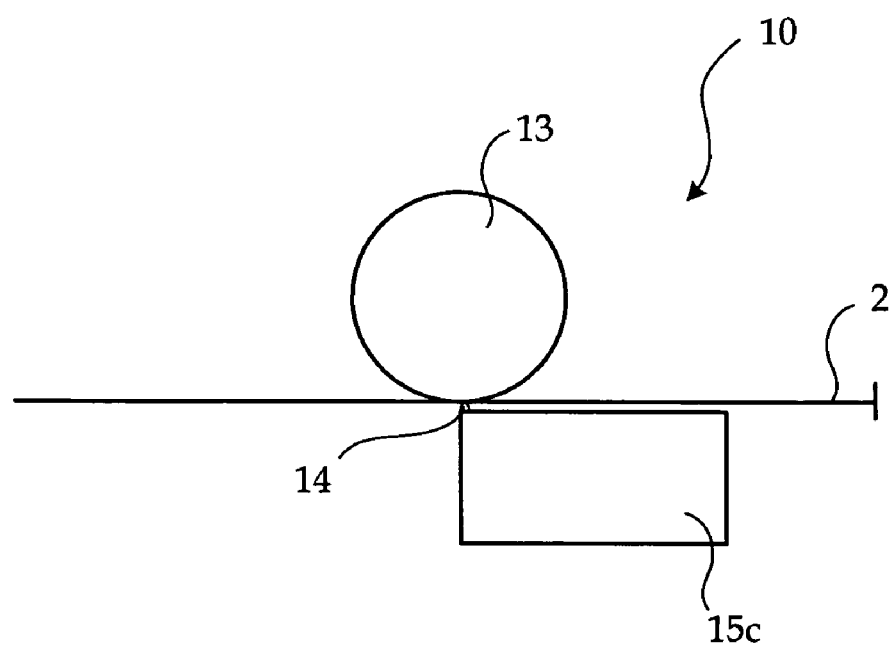

A pressure belt 17 (FIG. 4) can be used instead of the platen roll 13. Likewise, a near-edge type thermal head 15a (FIG. 5), an end-face type thermal head 15b (FIG. 6) or a corner edge type thermal head 15c (FIG. 7) can be used instead of the thermal head 15. These thermal heads 15a, 15b and 15c are so configured as not to come into contact with the thermally activated heat-sensitive adhesive layer 5, thus components constituting the thermally activated heat-sensitive adhesive layer 5 are prevented from sticking to the thermal head, and thus the heat-sensitive adhesive material 2 is prevented from winding to the thermal head.

Figure 8:
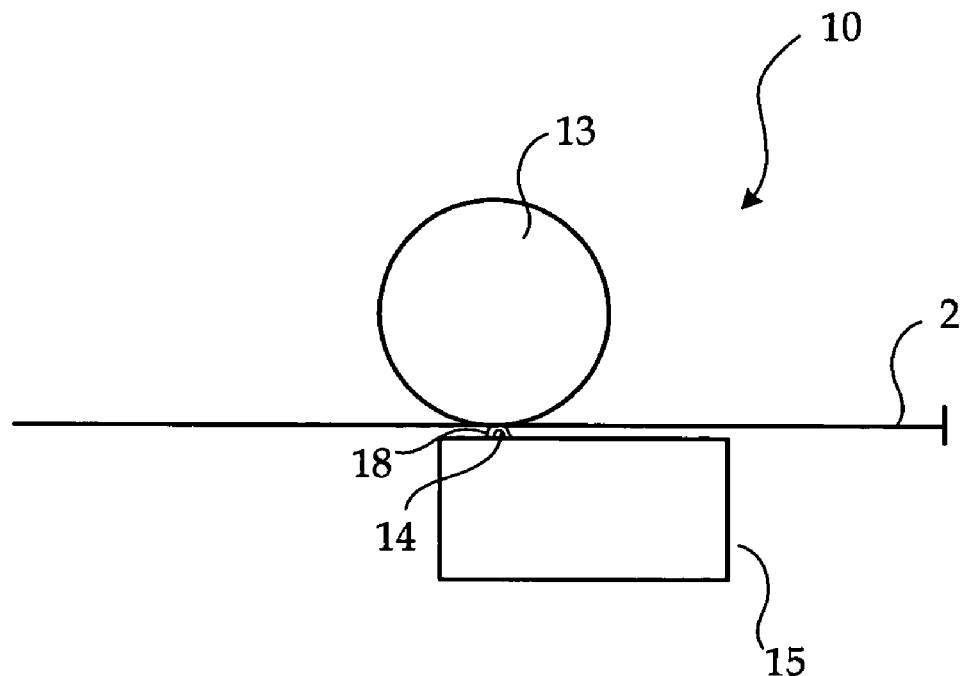

A release layer 18 (FIG. 8) may be arranged on the surface and therearound of the heating section 14 of the thermal head 15. The release layer may be formed as a Teflon coating 2 µm thick. Thus, components constituting the thermally activated heat-sensitive adhesive layer 5 are prevented from sticking to the heating section 14 of the thermal head 15, and thus the heat-sensitive adhesive material 2 is prevented from winding to the thermal head 15.

Figure 9:
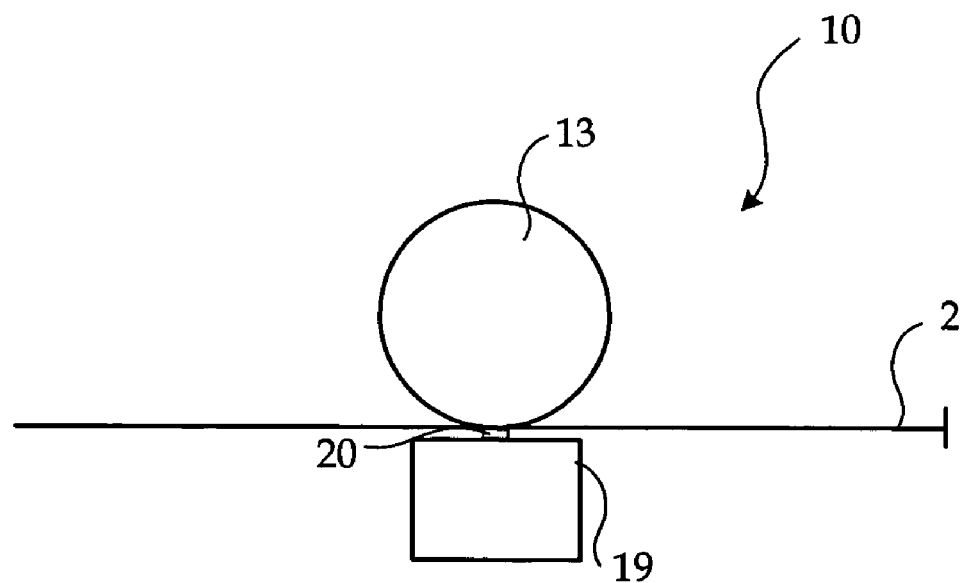

A thin-film heater 19 (FIG. 9) can be used as the heating unit instead of the thermal head 15. The thin-film heater 19 includes a heating section 20. The heating section 20 includes a ceramic substrate, a thick-layer heat-generative resistor as a band 1 mm wide arranged on the substrate, and a protective layer made of crystallized glass arranged on the thick-layer heat-generative resistor. In this case, the heat-sensitive adhesive layer 5 can be more efficiently thermally activated, since the heater 19 comes into contact with the heat-sensitive adhesive layer 5 in a width as wide as 1 mm.

With reference to FIG. 2, the heat-sensitive adhesive material 2 includes woodfree paper 4 serving as a substrate, a heat-sensitive adhesive layer 5 arranged on one side of the woodfree paper 4, and a heat-insulating layer 6 and a thermal recording layer 7 arranged on the other side. The thermal recording layer 7 can be replaced by, for example, a printed layer carrying a color print, a heat-sensitive transfer (fusion transfer) recording layer, an ink-jet recording layer, a sublimation dye transfer recording layer, or an electrophotographic recording layer (electrostatic recording layer).

The heat-sensitive adhesive material 2 which has been wound in the form of a roll is attached to the holding unit 3 and is then pulled out from the holding unit 3. Heat is applied from a heating section 11a of the thermal head 11 to the thermal recording layer 7 of the heat-sensitive adhesive material 2 to develop and color the thermal recording layer 7 to thereby record predetermined information on the thermal recording layer 7. After recording information on the thermal recording layer 7, the heat-sensitive adhesive material 2 is transported. At this time, the heat-sensitive adhesive layer 5 is in contact with the heating section 14 of the thermal head 15 and is thermally activated by allowing the heating section 14 to generate heat.

The heating section 14 is so arranged as to be in contact with the heat-sensitive adhesive layer 5 at this point of time and can thereby reliably thermally activate the heat-sensitive adhesive layer 5 by allowing the heating section 14 to generate heat. In addition, the heat from the heating section 14 can be efficiently transmitted to the heat-sensitive adhesive layer 5, and the heat-sensitive adhesive layer 5 can be thermally activated simultaneously with energizing, thus there is no need of keeping applying heat to the heating section 14 for thermal activation beforehand. Thus, the thermal activation can be performed with reduced energy consumption and without overheating the heat-sensitive adhesive material 2. The apparatus 1 can thereby be operated with higher safety. Owing to efficient transfer of the heat from the heating section 14 to the heat-sensitive adhesive layer 5, the heat-sensitive adhesive layer 5 in contact with the heating section 14 can be thermally activated even when the heat-sensitive adhesive material 2 is transported at a high speed. Thus, components constituting the thermally activated heat-sensitive adhesive layer 5 are prevented from sticking to the heating section 14, and the heat-sensitive adhesive material 2 can be thermally activated and applied to the adherend efficiently.

Figure 3:
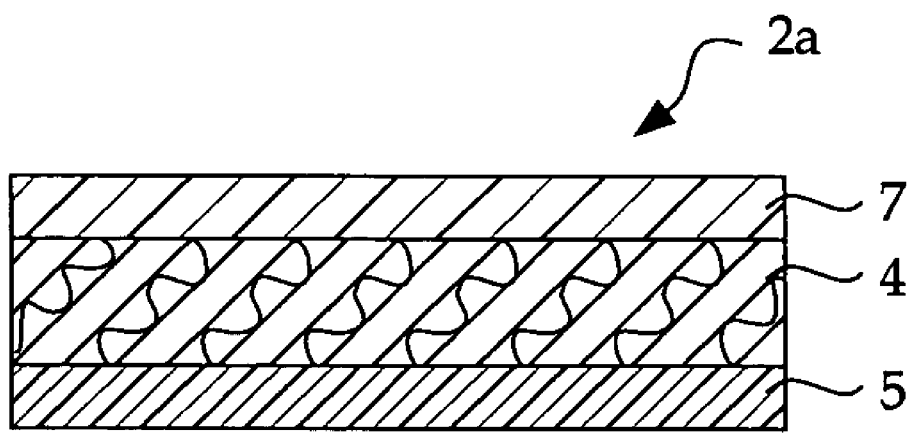
FIG. 3 is a schematic sectional view showing another example of the heat-sensitive adhesive material of the present invention.

When the heat-sensitive adhesive material 2 comprises a heat-insulating layer 6 between the woodfree paper 4 and the thermal recording layer 7, the heat-insulating layer 6 serves to prevent the heat for thermal activation of the heat-sensitive adhesive layer 5 from transferring to the thermal recording layer 7, thus efficiently utilizing the applied heat for thermal activation and avoiding unnecessary coloring of the thermal recording layer 7. A heat-sensitive adhesive material 2a (FIG. 3) has the same configuration as the heat-sensitive adhesive material 2 (FIG. 2) except that the heat-sensitive adhesive material 2 does not include the heat-insulating layer 6.

EXAMPLES

The present invention will be illustrated in further detail with reference to several examples and comparative examples below, which are not intended to limit the scope of the present invention. All parts and percentages below are by mass. All coating weights are coating weights after drying, unless otherwise specified.

Preparation of Solid Plasticizer Dispersion A

A solid plasticizer dispersion A was prepared by homogeneously blending 10 parts of the benzotriazole derivative shown in Table 1 as the solid plasticizer, 10 parts of a 10% aqueous solution of poly(vinyl alcohol) as a dispersing agent and 20 parts of water; pulverizing the mixture in a ball mill so that the solid plasticizer was dispersed as particles having an average particle diameter of 1.0 μm.

Preparation of Supercooling-improving Agent Dispersion B

A supercooling-improving agent dispersion B was prepared by homogeneously blending 10 parts of the compound shown in Table 1 as the supercooling-improving agent, 10 parts of a 10% aqueous solution of poly(vinyl alcohol) as a dispersing agent and 20 parts of water; pulverizing the mixture in a ball mill so that the supercooling-improving agent was dispersed as particles having an average particle diameter of 1.0 μm.

Preparation of Heat-sensitive Adhesive Coating Composition C

A heat-sensitive adhesive coating composition C was prepared by mixing 400 parts of the solid plasticizer dispersion A, 100 parts of 2-ethylhexyl acrylate emulsion (solid content: 50%) as the thermoplastic resin emulsion, 50 parts of a 50% dispersion of terpene phenol as the tackifier, and 20 parts of the supercooling-improving agent dispersion B. When the supercooling improving agent is indicated as "none" in Table 1, the supercooling-improving agent dispersion B was not used in the heat-sensitive adhesive composition C. When two different solid plasticizer dispersions A were used as the solid plasticizer dispersion A, they were used in an amount of 200 parts each.

Examples 1 to 8, and Comparative Examples 1 to 5

The heat-sensitive adhesive composition C was applied to one side of a substrate using a wire bar to a coating weight of the thermoplastic resin of 3.0 g/m², was dried and was cured in a room at a constant temperature of 29° C. and a constant relative humidity of 35% for 24 hours, to yield a heat-sensitive adhesive material.

TABLE 1

| | Solid Plasticizer | Supercooling-improving agent | Amount of Dispersion B in Composition C |
|---|---|---|---|
| Example 1 | (I) and (VI) | none | — |
| Example 2 | (I) and (IV) | none | — |
| Example 3 | (I) and (V) | none | — |
| Example 4 | (I) and (II) | none | — |
| Example 5 | (I) and (III) | none | — |
| Example 6 | (I) and (II) | di-(p-methylbenzyl) oxalate | 20 parts |
| Example 7 | (I) and (IV) | di-(p-methylbenzyl) oxalate | 20 parts |
| Example 8 | (I) and (II) | 4-acetylbiphenyl | 20 parts |
| Com. Ex. 1 | (I) | none | — |
| Com. Ex. 2 | (II) | none | — |
| Com. Ex. 3 | (V) | none | — |
| Com. Ex. 4 | (I) | di-(p-methylbenzyl) oxalate | 20 parts |
| Com. Ex. 5 | (I) | 4-acetylbiphenyl | 20 parts |

Adhesive Strength Test

At a temperature of 20° C. and a relative humidity of 30%, each of the above-prepared heat-sensitive adhesive materials was cut into a rectangular test piece 4.0 cm wide and 9.0 cm long. Information was printed on the thermal recording layer of the test piece using a thermal head at a thermal energy of 0.54 mJ/dot, a print speed of 4 ms/line and a platen pressure of 6 kgf/line, and the heat-sensitive adhesive layer was thermally activated using a thermal head at a thermal energy of 0.45 mJ/dot, a conveyance speed of 4 ms/line and a platen pressure of 6 kgf/line.

The test piece was then applied to each of two adherends, i.e., a corrugated fiberboard and a polyethylene nonwoven fabric (Tyvek, from Du Pont) in a longitudinal direction using a rubber roller at a pressure of 2 kg to yield test samples. The test sample was left to stand under the same conditions, and the heat-sensitive adhesive material was peeled off from the adherend at a peel angle of 180 degrees and a peel speed of 300 mm/min immediately (two minutes), one hour, or one day (24 hours) after the application. Tables 2 and 3 show the adhesive strength in gf/40-mm to the corrugated fiberboard and to the polyethylene nonwoven fabric, respectively.

TABLE 2

Adhesive Strength to Corrugated Fiberboard

| | Immediately after application | One hour later | One day later |
|---|---|---|---|
| Example 1 | 400 | 460 | 700 |
| Example 2 | 300 | 500 | 900 |
| Example 3 | 200 | 250 | 850 |
| Example 4 | 500 | 960 | 1000 |
| Example 5 | 400 | 1000 | 1000 |
| Example 6 | 520 | 1000 | 1150 |
| Example 7 | 550 | 890 | 920 |
| Example 8 | 560 | 1120 | 1190 |
| Com. Ex. 1 | 600 | 200 | 130 |
| Com. Ex. 2 | 400 | 380 | 150 |
| Com. Ex. 3 | 650 | 270 | 170 |
| Com. Ex. 4 | 850 | 700 | 400 |
| Com. Ex. 5 | 900 | 800 | 400 |

TABLE 3

Adhesive Strength to Polyethylene Nonwoven Fabric

| | Immediately after application | One hour later | One day later |
|---|---|---|---|
| Example 1 | 40 | 300 | 500 |
| Example 2 | 100 | 400 | 700 |
| Example 3 | 90 | 300 | 600 |
| Example 4 | 180 | 590 | 1100 |
| Example 5 | 160 | 610 | 1050 |
| Example 6 | 240 | 890 | 1030 |
| Example 7 | 290 | 810 | 890 |
| Example 8 | 270 | 950 | 1050 |
| Com. Ex. 1 | 500 | 350 | 70 |

TABLE 3-continued

Adhesive Strength to Polyethylene Nonwoven Fabric

|  | Immediately after application | One hour later | One day later |
|---|---|---|---|
| Com. Ex. 2 | 290 | 230 | 160 |
| Com. Ex. 3 | 350 | 360 | 30 |
| Com. Ex. 4 | 750 | 650 | 50 |
| Com. Ex. 5 | 800 | 800 | 100 |

These results show that the heat-sensitive adhesive materials according to the present invention can be reapplied immediately after applying to an adherend in order to reposition and the like, have an increasing adhesive strength with time and become hardly peeled off after lapse of a certain period of time. The heat-sensitive adhesive materials exhibit similar properties to adherends such as polyethylene nonwoven fabrics to which conventional heat-sensitive adhesive materials do not exhibit a sufficient adhesive strength. They keep their high adhesive strength with time to various adherends and thus have excellent properties in contrast to conventional equivalents.

Example 9

A heat-sensitive adhesive material was prepared and the adhesive strength thereof was determined by the procedure of Example 1, except for using three solid plasticizer dispersions A containing three benzotriazole derivatives (I), (II) and (IV), respectively, in equal proportions in a total amount of 400 parts. The results are shown in Tables 5 and 6.

Examples 10 to 13

A series of heat-sensitive adhesive materials was prepared and the adhesive strength thereof was determined by the procedure of Example 1, except for using the solid plasticizers shown in Table 4. The results are shown in Tables 5 and 6.

TABLE 4

|  | Solid Plasticizer | Supercooling-improving agent | Amount of Dispersion B in Composition C |
|---|---|---|---|
| Example 9 | (I), (II) and (IV) | none | — |
| Example 10 | (I) and (VII) | none | — |
| Example 11 | (I) and (VIII) | none | — |
| Example 12 | (I) and (IX) | none | — |
| Example 13 | (I) and (X) | none | — |

TABLE 5

Adhesive Strength to Corrugated Fiberboard (gf/40-mm)

|  | Immediately after application | One hour later | One day later |
|---|---|---|---|
| Example 9 | 250 | 450 | 900 |
| Example 10 | 280 | 400 | 680 |
| Example 11 | 420 | 480 | 720 |
| Example 12 | 380 | 450 | 700 |
| Example 13 | 360 | 390 | 740 |

TABLE 6

Adhesive Strength to Polyethylene Nonwoven Fabric (gf/40-mm)

|  | Immediately after application | One hour later | One day later |
|---|---|---|---|
| Example 9 | 150 | 380 | 800 |
| Example 10 | 100 | 270 | 720 |
| Example 11 | 120 | 350 | 540 |
| Example 12 | 80 | 400 | 550 |
| Example 13 | 100 | 380 | 530 |

The present invention provides heat-sensitive adhesive materials that can be applied to adherends of various materials such as resins, polyolefin wrap in the field of food POS as well as polyolefin nonwoven fabrics including envelopes. The heat-sensitive adhesive materials do not require a release paper (liner), do not exhibit adhesiveness before application and exhibit suitably controlled adhesiveness (adhesive strength) upon application (thermal activation). They exhibit a low adhesive strength to an adherend immediately after application, which allows the material to be reapplied and avoids application failure, exhibit an increasing adhesive strength with time, which prevents the material from peeling off from the adherend and allows desired information to be recorded or printed thereon. The present invention also provides the article including an adherend and the heat-sensitive adhesive material applied thereto, as well as the process and apparatus for efficiently activating the heat-sensitive adhesive material.

The heat-sensitive adhesive materials of the present invention are suitably used, for example, labels applicable to polyolefin wrap in the field of food POS systems and to polyolefin nonwoven fabrics such as envelopes.

The adhered article of the present invention is suitably used for example, as packaging materials in the field of food POS systems.

The process for thermally activating the heat-sensitive adhesive material of the present invention can be applied, for example, as a process for activating labels in the field of food POS systems.

The apparatus for thermally activating the heat-sensitive adhesive material of the present invention can be applied, for example, as an apparatus for activating labels in the field of food POS systems.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A heat-sensitive adhesive material comprising:
    a substrate; and
    a heat-sensitive adhesive layer comprising a thermoplastic resin and a solid plasticizer, and being so configured as to be heated and applied to an adherend,
    wherein the heat-sensitive adhesive material exhibits such an adhesive strength to the adherend as to increase with time from immediately after applying the heat-sensitive adhesive material to the adherend, and wherein the solid plasticizer comprises at least two different benzotriazole derivatives selected from compounds represented by following Formula (A):

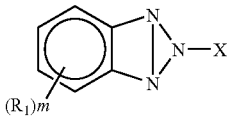

Formula (A)

wherein $R_1$ is one of a hydrogen atom, a halogen atom and an alkyl group; m is an integer of 1 to 4; and X is one of a hydrogen atom, an alkyl group, an aryl group, an aralkyl group and a group represented by following Formula (B):

Formula (B)

wherein $R_2$ is one of a hydrogen atom, a halogen atom, an alkyl group and hydroxyl group; and n is an integer of 1 to 5.

2. A heat-sensitive adhesive material according to claim 1, wherein the solid plasticizer is solid at room temperature and capable of being fused or softened upon heating to thereby become compatible with the thermoplastic resin, and wherein, when the adhesive strength to peel off the heat-sensitive adhesive layer from the adherend is determined according to a measuring procedure specified in the adhesive tape/adhesive sheet test method in Japanese Industrial Standards (JIS) Z0237, the heat-sensitive adhesive layer exhibits an adhesive strength of 300 gf/40-mm or less to peel off from the adherend two minutes after the application, and an adhesive strength of 500 gf/40-mm or more to peel off from the adherend 24 hours after the application.

3. A heat-sensitive adhesive material according to claim 1, wherein the at least two different benzotriazole derivatives are selected from compounds represented by following Formulae (I), (II), (III), (IV) and (V):

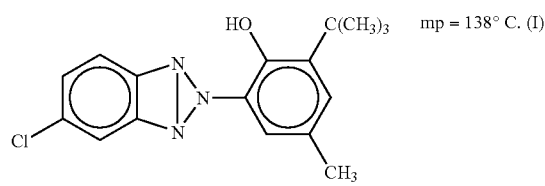

mp = 138° C. (I)

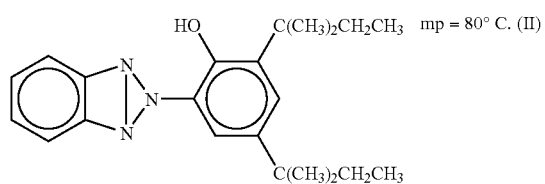

mp = 80° C. (II)

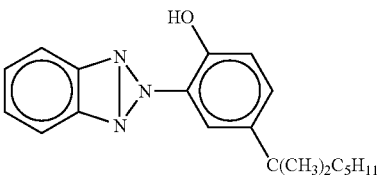

mp = 102° C. (III)

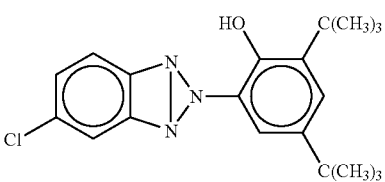

mp = 152° C. (IV)

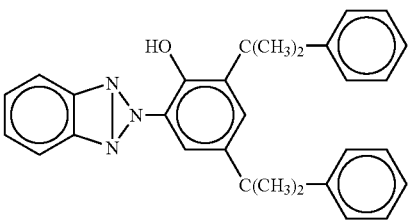

mp = 140° C. (V).

4. A heat-sensitive adhesive material according to claim 3, wherein one of the at least two different benzotriazole derivatives is the compound represented by Formula (I).

5. A heat-sensitive adhesive material according to claim 3, wherein the at least two different benzotriazole derivatives include the compound represented by Formula (I) and the compound represented by Formula (IV).

6. A heat-sensitive adhesive material according to claim 1, wherein the difference in melting point between the at least two different benzotriazole derivatives is 30° C. or more.

7. A heat-sensitive adhesive material according to claim 1, wherein the solid plasticizer is dispersed in the heat-sensitive adhesive layer as particles having an average particle diameter of 10 μm or less.

8. A heat-sensitive adhesive material according to claim 1, wherein at least one of the heat-sensitive adhesive layer and an adjacent layer thereto comprises a supercooling-improving agent.

9. A heat-sensitive adhesive material according to claim 8, wherein the supercooling-improving agent is dispersed in the at least one of the heat-sensitive adhesive layer and an adjacent layer thereto as particles having an average particle diameter of 10 μm or less.

10. A heat-sensitive adhesive material according to claim 1, wherein the heat-sensitive adhesive layer comprises a tackifier.

11. A heat-sensitive adhesive material according to claim 1, further comprising a recording layer on the opposite side of the substrate to the heat-sensitive adhesive layer.

12. A heat-sensitive adhesive material according to claim 11, wherein the recording layer is at least one of a thermal recording layer, an ink-jet recording layer and an electrophotographic recording layer.

13. A heat-sensitive adhesive material according to claim 1, which is cut into pieces before use.

14. A heat-sensitive adhesive material according to claim 1, which has notches.

15. A heat-sensitive adhesive material according to claim 1, wherein the adherend is a polyethylene nonwoven fabric.

16. A heat-sensitive adhesive material according to claim 1, which is wound in the form of a roll.

17. An article comprising:

an adherend; and a heat-sensitive adhesive material comprising:

a substrate; and a heat-sensitive adhesive layer comprising a thermoplastic resin and a solid plasticizer, and being so configured as to be heated and applied to the adherend, wherein the heat-sensitive adhesive material exhibits such an adhesive strength to the adherend as to increase with time from immediately after applying the heat-sensitive adhesive material to the adherend, and wherein the solid plasticizer comprises at least two different benzotriazole derivatives selected from compounds represented by following Formula (A):

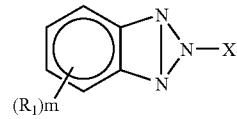

Formula (A)

wherein $R_1$ is one of a hydrogen atom, a halogen atom and an alkyl group; m is an integer of 1 to 4; and X is one of a hydrogen atom, an alkyl group, an aryl group, an aralkyl group and a group represented by following Formula (B):

Formula (B)

wherein $R_2$ is one of a hydrogen atom, a halogen atom, an alkyl group and hydroxyl group; and n is an integer of 1 to 5.

* * * * *